US012724557B2

(12) United States Patent
Yamashita

(10) Patent No.: US 12,724,557 B2
(45) Date of Patent: Sep. 1, 2026

(54) DATA RECORDING SYSTEM AND METHOD OF CONTROLLING DATA RECORDING SYSTEM

(71) Applicant: Panasonic Intellectual Property Management Co., Ltd., Osaka (JP)

(72) Inventor: Hideaki Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/234,945

(22) Filed: Aug. 17, 2023

(65) Prior Publication Data

US 2023/0393773 A1 Dec. 7, 2023

Related U.S. Application Data

(63) Continuation of application No. PCT/JP2021/034689, filed on Sep. 22, 2021.

(30) Foreign Application Priority Data

Feb. 25, 2021 (JP) ................................ 2021-028050

(51) Int. Cl.
*G06F 3/06* (2006.01)

(52) U.S. Cl.
CPC ............ *G06F 3/0647* (2013.01); *G06F 3/061* (2013.01); *G06F 3/0619* (2013.01); *G06F 3/0683* (2013.01)

(58) Field of Classification Search
CPC ...... G06F 3/0647; G06F 3/061; G06F 3/0619; G06F 3/0683; G06F 3/0659; G06F 3/0686; G06F 12/06; G11B 20/10
See application file for complete search history.

(56) References Cited

U.S. PATENT DOCUMENTS

2009/0190470 A1 7/2009 Hinosugi et al.
2010/0042862 A1* 2/2010 Sun ...................... H04W 76/30 713/340

(Continued)

FOREIGN PATENT DOCUMENTS

JP 2004-289307 10/2004
JP 2004289307 A * 10/2004

(Continued)

OTHER PUBLICATIONS

J. Luo, L. Fan, Z. Chen and Z. Li, "A solid state drive architecture with memory card modules," in IEEE Transactions on Consumer Electronics, vol. 62, No. 1, pp. 17-22, Feb. 2016, doi: 10.1109/TCE.2016.7448558 (Year: 2016).*

(Continued)

*Primary Examiner* — Curtis James Kortman
(74) *Attorney, Agent, or Firm* — Wenderoth, Lind & Ponack, L.L.P.

(57) ABSTRACT

A data recording system includes a first removable storage which is removable, a second removable storage, and a controller which controls writing of video data to the first removable storage and the second removable storage. The controller (a): for each of pieces of partial data divided from predetermined data, writes the piece of partial data to one of a first removable storage or a second removable storage while switching a write destination of the piece of partial data between the first removable storage and the second removable storage; and (b) migrates one or more of the pieces of partial data written in the second removable storage to the first removable storage before the first removable storage is removed.

4 Claims, 7 Drawing Sheets

(56) References Cited

U.S. PATENT DOCUMENTS

| | | | | |
|---|---|---|---|---|
| 2013/0138901 | A1* | 5/2013 | Cordero | G06F 11/1666 711/E12.103 |
| 2014/0113460 | A1* | 4/2014 | Park | G06K 13/085 439/55 |
| 2014/0122546 | A1 | 5/2014 | Liao et al. | |
| 2017/0060477 | A1* | 3/2017 | Kodera | G11C 29/12 |
| 2017/0168548 | A1 | 6/2017 | Werkheiser et al. | |
| 2019/0196732 | A1* | 6/2019 | Desai | G06F 3/0604 |
| 2021/0064280 | A1* | 3/2021 | Gunda | G11B 27/005 |
| 2021/0117119 | A1* | 4/2021 | Kim | G06F 3/0644 |
| 2021/0165737 | A1* | 6/2021 | Frolikov | G06F 3/0679 |

FOREIGN PATENT DOCUMENTS

| | | |
|---|---|---|
| JP | 2005-64926 | 3/2005 |
| JP | 2005064926 A * | 3/2005 |
| JP | 2005-117454 | 4/2005 |
| JP | 2005-175567 | 6/2005 |
| JP | 2008-77780 | 4/2008 |
| JP | 4881887 | 2/2012 |
| JP | 2015-532997 | 11/2015 |
| JP | 2016-10084 | 1/2016 |
| JP | 2017-107557 | 6/2017 |
| JP | 2017-120944 | 7/2017 |
| WO | 2014/070376 | 5/2014 |

OTHER PUBLICATIONS

Robert P. Ingalls, “RAID”, Dec. 5, 2004, RPI, online class notes for Week 8 of the Fall 2004 Operating Systems class at RPI, as preserved by the Internet Archive on Dec. 5, 2004, pp. 1-12 (Year: 2004).*

International Search Report issued Dec. 28, 2021 in International (PCT) Application No. PCT/JP2021/034689.

* cited by examiner 2
8
Control apparatus
6
Recording apparatus
10
4
Video processing apparatus

FIG. 2

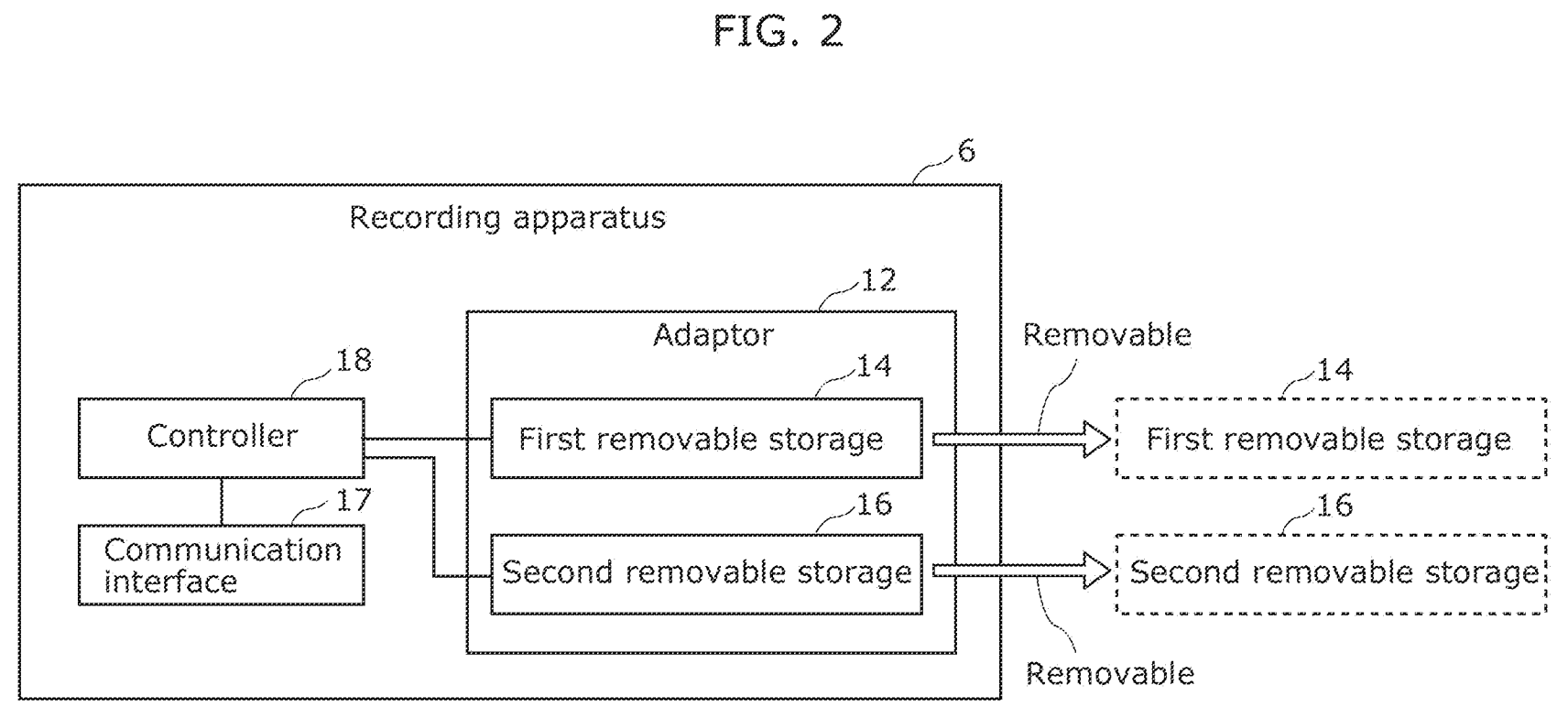

6
Recording apparatus
12
Adaptor
14
First removable storage
16
Second removable storage
18
Controller
17
Communication interface
Removable
14
First removable storage
Removable
16
Second removable storage

DATA RECORDING SYSTEM AND METHOD OF CONTROLLING DATA RECORDING SYSTEM

CROSS REFERENCE TO RELATED APPLICATIONS

This is a continuation application of PCT International Application No. PCT/JP2021/034689 filed on Sep. 22, 2021, designating the United States of America, which is based on and claims priority of Japanese Patent Application No, 2021-028050 filed on Feb. 25, 2021. The entire disclosures of the above-identified applications, including the specifications, drawings and claims are incorporated herein by reference in theft entirety.

FIELD

The present disclosure relates to a data recording system and a method of controlling a data recording system.

BACKGROUND

Data recording systems each including a plurality of removable storages are known (see Patent Literature (PTL) 1, for example). In such a data recording system, when a host apparatus intensively accesses to a single removable storage among a plurality of removable storages, writing performance (such as a recording rate) in the removable storage reduces.

CITATION LIST

Patent Literature

PTL 1: Japanese Unexamined Patent Application Publication (Translation of PCT Application) No. 2015-532997

SUMMARY

Technical Problem

The present disclosure provides a data recording system which can increase writing performance, and a method of controlling a data recording system.

Solution to Problem

The data recording system according to the present disclosure includes a first recording medium which is removable; a second recording medium; and a controller which controls writing of data to the first recording medium and the second recording medium. Here, the controller: (a) for each of pieces of partial data divided from predetermined data, writes the piece of partial data to one of the first recording medium or the second recording medium while switching a write destination of the piece of partial data between the first recording medium and the second recording medium; and (b) migrates one or more of the pieces of partial data written in the second recording medium to the first recording medium before the first recording medium is removed.

Advantageous Effects

The data recording system according to the present disclosure and the like can increase writing performance.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram illustrating a functional configuration of the recording apparatus according to Embodiment 1.

DESCRIPTION OF EMBODIMENTS

Hereinafter, embodiments will be described in detail with reference to the drawings. To be noted, detailed descriptions beyond necessity will be omitted in some cases. For example, detailed descriptions of things already well known and overlapping descriptions of substantially identical configurations may be omitted in some cases. This is for avoiding unnecessarily redundant description below and facilitating understanding by persons skilled in the art.

The present inventor provides the attached drawings and the description below to make persons skilled in the art sufficiently understand the present disclosure, and it is not intended to limit the subject described in Claims with these.

Embodiment 1

[1-1. Configuration of Data Recording System]

Figure 1:
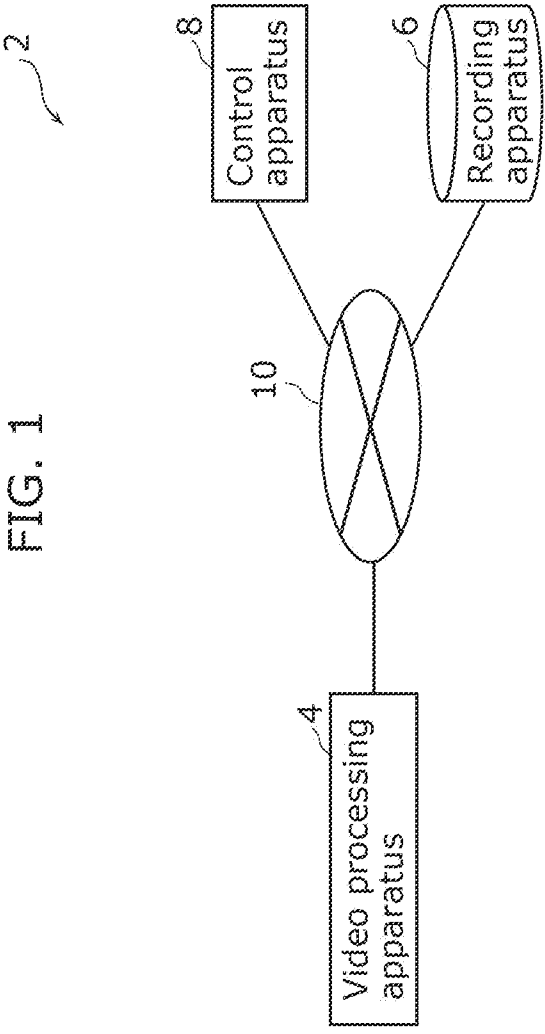
FIG. 1 is a block diagram illustrating a configuration of the data recording system according to Embodiment 1.

First, the configuration of data recording system 2 according to Embodiment 1 will be described with reference to FIG. 1. FIG. 1 is a block diagram illustrating the configuration of data recording system 2 according to Embodiment 1.

As illustrated in FIG. 1, data recording system 2 according to Embodiment 1 includes video processing apparatus 4, recording apparatus 6, and control apparatus 8. These video processing apparatus 4, recording apparatus 6 and control apparatus 8 are communicably connected to each other via network 10. Network 10 is configured with the Ethernet (registered trademark), for example.

Video processing apparatus 4 is a host apparatus for processing video data (one example of predetermined data) indicating a video, and is a video editing apparatus or a recording/reproducing apparatus, for example. Video processing apparatus 4 is a memory for recording software programs, such as a read only memory (ROM) or a random access memory (RAM), a central processing unit (CPU) which reads out and executes the software programs recorded in the memory, a communication interface for communicating with other apparatuses via network 10, and a storage for recording the video data. The storage is a solid state drive (SSD) including a NAND flash memory, for example.

Recording apparatus 6 is a storage unit for recording a variety of pieces of data. Recording apparatus 6 includes a memory for recording software programs, such as a ROM or a RAM, a CPU which reads out and executes the software programs recorded in the memory, a communication interface for communicating with other apparatuses via network 10, and a storage for recording a variety of pieces of data. The storage is an SSD including a NAND flash memory or a removable memory card, for example. A component (controller 18 described later) in recording apparatus 6 is implemented by the CPU reading out and executing the software programs recorded in the memory.

In the storage in recording apparatus 6, data is written in units of pages, and is deleted in units of blocks each including a plurality of pages. Recording apparatus 6 is accessed from other apparatuses via network 12 using a protocol of the storage included in recording apparatus 6, such as Non-Volatile Memory express-over Fabrics (NVMe-oF), Inside recording apparatus 6, access is executed using a protocol of the storage included in recording apparatus 6, such as NVMe.

In data recording system 2 described above, video processing apparatus 4 can directly access to recording apparatus 6 via network 10 by directly specifying the address inside the storage using a protocol of the storage included in recording apparatus 6.

Control apparatus 8 is an adjustment module for controlling access of video processing apparatus 4 to recording apparatus 6. Control apparatus 8 includes a memory for recording software programs, such as a ROM or a RAM, a CPU which reads out and executes the software programs recorded in the memory, and a communication interface for communicating with other apparatuses via network 10. Components of control apparatus 8 (communicator reserver 22, generator 24, and controller 26 described later) are implemented by the CPU reading out and executing the software programs recorded in the memory.

[1-2. Functional Configuration of Recording Apparatus]

Next, the functional configuration of recording apparatus 6 will be described with reference to FIG. 2, FIG. 2 is a block diagram illustrating the functional configuration of recording apparatus 6 according to Embodiment 1.

As illustrated in FIG. 2, recording apparatus 6 has a functional configuration including adaptor 12, first removable storage 14 (one example of a first recording medium), second removable storage 16 (one example of second recording medium), communication interface 17, and controller 18.

Adaptor 12 includes a first slot and a second slot for detachably inserting first removable storage 14 and second removable storage 16, respectively.

First removable storage 14 is a removable memory card detachably inserted into the first slot of adaptor 12, and constitutes the storage included in recording apparatus 6. First removable storage 14 includes a NAND flash memory, for example.

Second removable storage 16 is a removable memory card detachably inserted into the second slot of adaptor 12, and constitutes the storage included in recording apparatus 6. Second removable storage 16 includes a NAND flash memory, for example.

Communication interface 17 transmits and receives a variety of pieces of data to and from video processing apparatus 4 and control apparatus 8.

Controller 18 controls writing of data to first removable storage 14 and second removable storage 16 inserted in the first slot and the second slot of adaptor 12, respectively. Controller 18 transmits and receives a variety of pieces of data via communication interface 17 by controlling communication interface 17.

[1-3. Functional Configuration of Control Apparatus]

Figure 3:
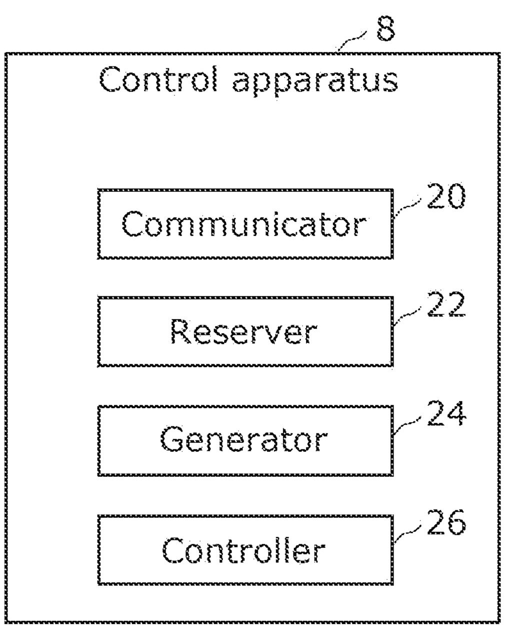
FIG. 3 is a block diagram illustrating the functional configuration of the control apparatus according to Embodiment 1.

Next, the functional configuration of control apparatus 8 will be described with reference to FIG. 3. FIG. 3 is a block diagram illustrating the functional configuration of control apparatus 8 according to Embodiment 1.

As illustrated in FIG. 3, control apparatus 8 has a functional configuration including communicator 20, reserver 22, generator 24, and controller 26.

Communicator 20 is a communication interface which transmits and receives a variety of pieces of data to and from video processing apparatus 4 and recording apparatus 6.

Reserver 22 reserves a recording region for writing video data in the storage included in recording apparatus 6 based on a reservation command (described later) from video processing apparatus 4. The recording region is a recording region in the storage included in recording apparatus 6, the recording region containing a single block or a plurality of continuous blocks.

Generator 24 generates access information (described later) concerning the recording region reserved by reserver 22.

Controller 26 executes a variety of processings for controlling control apparatus 8.

[1-4. Operation of Data Recording System]

Figure 4:
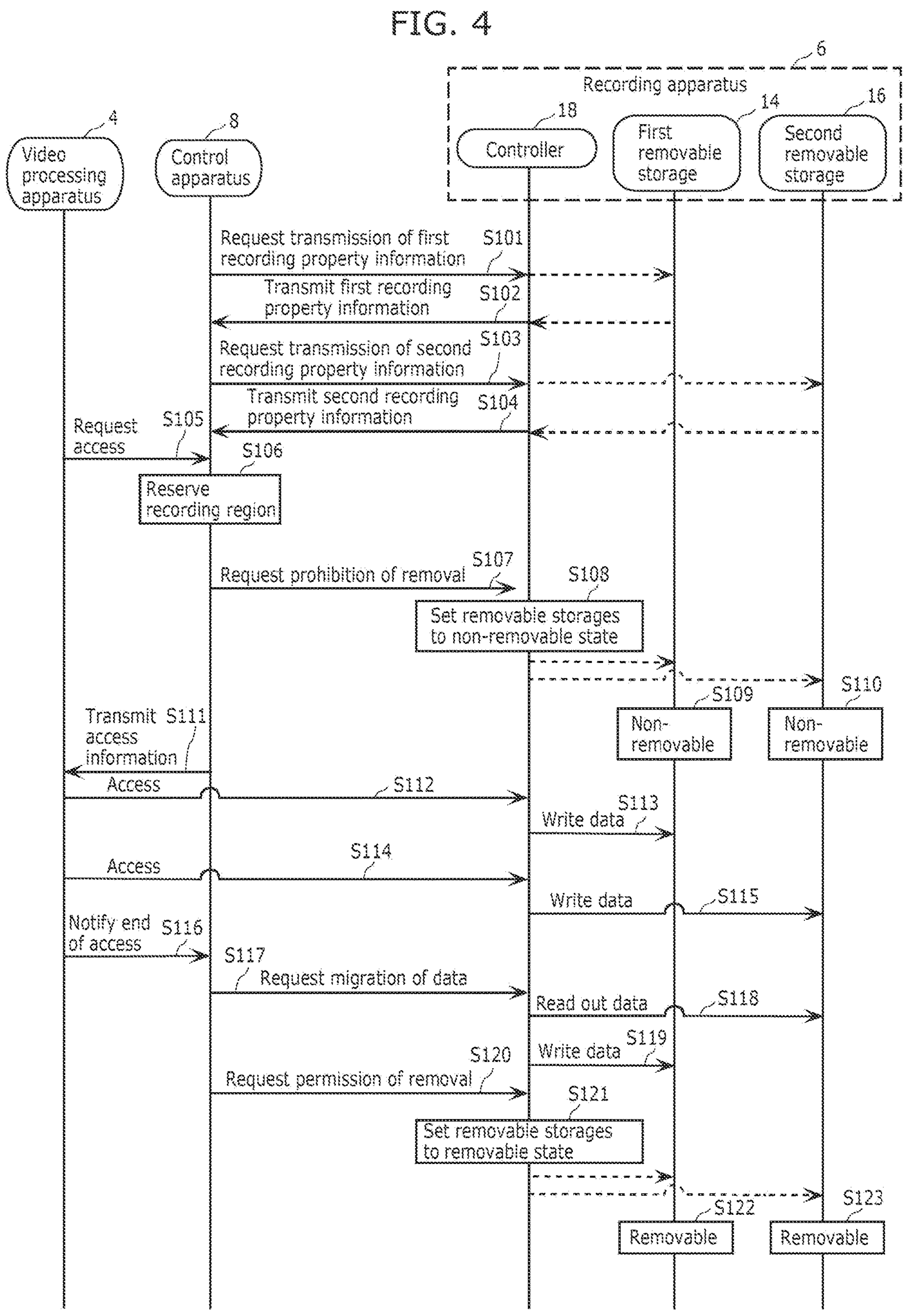
FIG. 4 is a sequence diagram illustrating a flow of the operation of the data recording system according to Embodiment 1.
Figure 5:
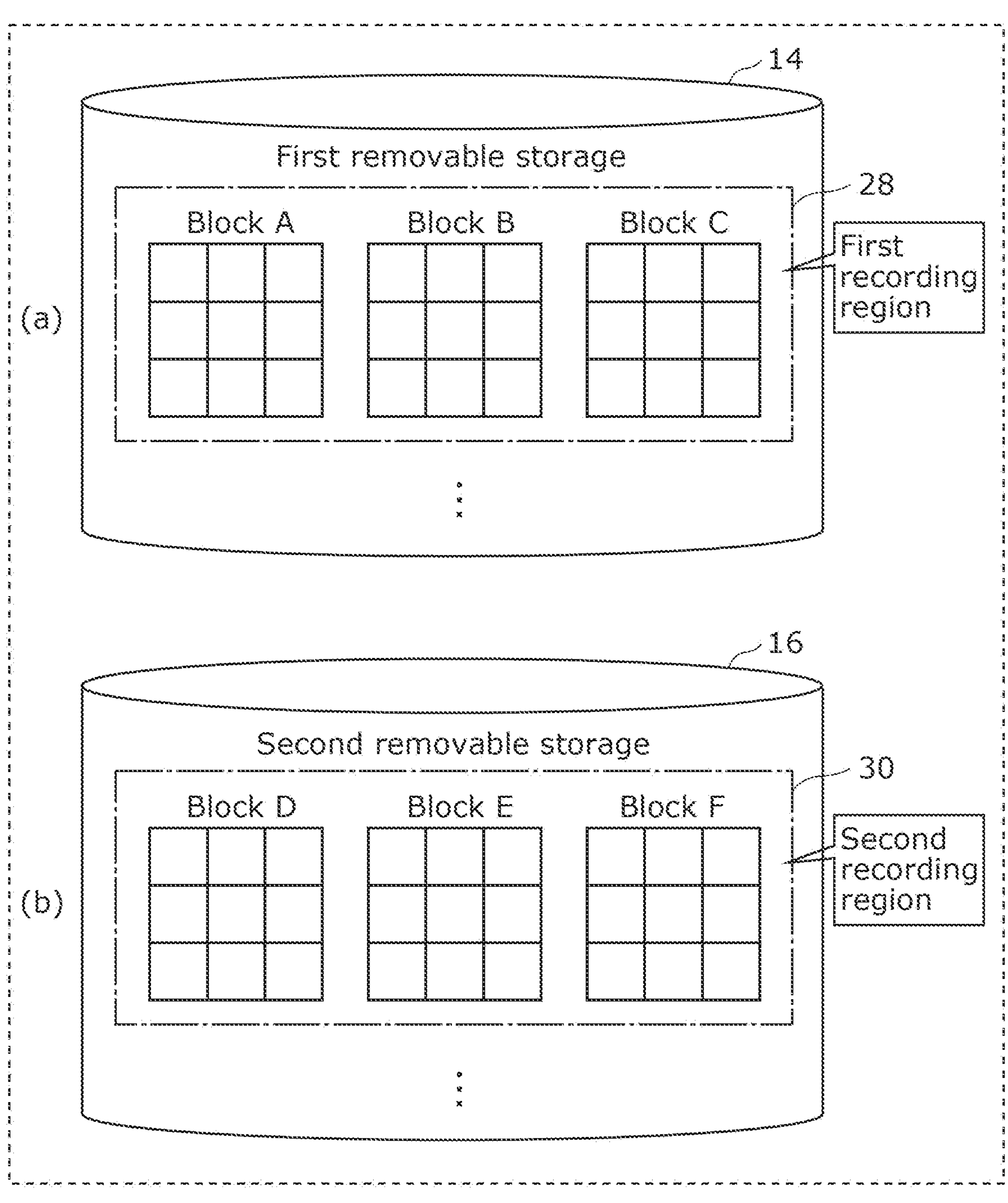
FIG. 5 is a diagram illustrating one example of a first recording region and a second recording region.

Next, the operation of data recording system 2 according to Embodiment 1 will be described with reference to FIGS. 4 and 5. FIG. 4 is a sequence diagram illustrating the flow of the operation of data recording system 2 according to Embodiment 1. FIG. 5 is a diagram illustrating one example of first recording region 28 and second recording region 30.

Hereinafter, a case where using the protocol of the storage included in recording apparatus 6, video processing apparatus 4 writes video data to the storage included in recording apparatus 6 via network 10 will be described.

As illustrated in FIG. 4, first, communicator 20 in control apparatus 8 requests transmission of first recording property information of controller 18 in recording apparatus 6 via network 10 (S101), The first recording property information is information indicating the page size of first removable storage 14, the block size thereof, and the performance thereof in units of pages, for example. The performance in units of pages is the time needed to write data per page, for example.

In response to the request from control apparatus 8, controller 18 in recording apparatus 6 obtains the first recording property information by accessing to first removable storage 14. In FIG. 4, the flow of transmission and reception of signals inside recording apparatus 6 (specifically, transmission and reception of signals between controller 18 and first removable storage 14, the signals concerning request and obtaining of the first recording property information) is simply indicated with arrowed dashed lines. Controller 18 in recording apparatus 6 transmits the obtained first recording property information to control apparatus 8 via network 10 (S102), Communicator 20 in control apparatus 8 receives the first recording property information from recording apparatus 6, and stores the received first recording property information in the memory (not illustrated) such as a ROM or a RAM.

Next, communicator 20 in control apparatus 8 requests transmission of the second recording property information of controller 18 in recording apparatus 6 via network 10 (S103), The second recording property information is information indicating the page size of second removable storage 16, the block size thereof, and the performance thereof in units of pages, for example.

In response to the request from control apparatus 8, controller 18 in recording apparatus 6 obtains the second recording property information by accessing to second removable storage 16. In FIG. 4, the flow of transmission and reception of signals inside recording apparatus 6 (specifically, transmission and reception of signals between controller 18 and second removable storage 16, the signals concerning request and obtaining of the first recording property information) is simply indicated with arrowed dashed lines. Controller 18 in recording apparatus 6 transmits the obtained second recording property information to control apparatus 8 via network 10 (S104), Communicator 20 in control apparatus 8 receives the second recording property information from recording apparatus 6, and stores the received second recording property information in the memory such as a ROM or a RAM.

Video processing apparatus 4 requests access of control apparatus 8 via network 10 (S105). Specifically, video processing apparatus 4 transmits a reservation command to control apparatus 8 via network 10. The reservation command is a command signal for instructing control apparatus 8 to reserve a recording region for writing the video data to the storage included in recording apparatus 6. The reservation command contains a) data size information indicating the data size of the video data and b) bandwidth information indicating the communication bandwidth (e.g., 2 Gbps) for recording apparatus 6 needed to write the video data to the storage included in recording apparatus 6, for example. In other words, the communication bandwidth for recording apparatus 6 is the recording rate needed to write the video data to the storage included in recording apparatus 6.

Communicator 20 in control apparatus 8 receives the reservation command from video processing apparatus 4. Reserver 22 in control apparatus 8 reserves a recording region to which the video data having a data size requested from video processing apparatus 4 can be written, in the storage included in recording apparatus 6 based on the reservation command received by communicator 20 (S106), Although reserver 22 in control apparatus 8 reserves the recording region in the present embodiment, the configuration is not limited to this. Video processing apparatus 4 may reserve the recording region. In this case, the processings in steps S105, S106, and S111 in FIG. 4 can be omitted. Namely, video processing apparatus 4, when accessing to recording apparatus 6, reserves the recording region, and then writes the video data to the recording region in recording apparatus 6. Alternatively, controller 18 in recording apparatus 6 may reserve the recording region.

In the present embodiment, in the communication bandwidth for recording apparatus 6 indicated by the bandwidth information contained in the reservation command, writing the video data only to first removable storage 14 causes shortage of the communication bandwidth, and thus it is necessary to write the video data not only to first removable storage 14 but also to second removable storage 16. For this reason, the recording region reserved by reserver 22 contains first recording region 28 illustrated in (a) of FIG. 5 and second recording region 30 illustrated in (b) of FIG. 5, for example. First recording region 28 is a recording region containing continuous three blocks (blocks A, B, and C) in first removable storage 14. Second recording region 30 is a recording region containing continuous three blocks (blocks D, E, and F) in second removable storage 16. Here, blocks A to C illustrated in (a) of FIG. 5 and blocks D to F illustrated in (b) of FIG. 5 all are empty blocks without data written. In the example illustrated in FIG. 5, each of nine squares arranged in 3 rows×3 columns in a block represents a page.

To be noted, data may be written to a blank page in a block containing a page to which data is written. The data can be written to continuous blank pages with a one-time recording command. At this time, when blank pages are continuous in the region, the recording rate becomes higher because the recording command is issued only one time, reducing overhead compared to the case where the recording command is issued for each of blank pages dispersed and the data is written. In contrast, when blank pages are dispersed, the recording rate becomes lower because the data cannot be written with a one-time recording command (namely, the recording command need be issued for each of blank pages dispersed), increasing overhead compared to the case where blank pages are continuous in the region. Accordingly, in this case, to maintain the recording rate, it is necessary to periodically execute garbage collection to collect blank pages.

In some cases, when recording apparatus 6 receives the recording command, the data may be written after execution of garbage collection. In such a case, the recording rate becomes lower by the execution of garbage collection. For this reason, it is desired to write the data after reserving the recording region in units of blocks to avoid occurrence of dispersed blank pages, which causes execution of garbage collection.

Communicator 20 in control apparatus 8 confirms the emptiness of the block in recording apparatus 6 via network 10 in a predetermined cycle. Thereby, reserver 22 in control apparatus 8 grapes the emptiness of the block in recording apparatus 6 in real time.

Communicator 20 in control apparatus 8 requests a prohibition of removal of first removable storage 14 and second removable storage 16 of controller 18 in recording apparatus 6 (S107). In response to the request from control apparatus 8, controller 18 in recording apparatus 6 sets first removable storage 14 and second removable storage 16 to a non-removable state (S108). This makes first removable storage 14 non-removable from the first slot of adaptor 12 (S109) and makes second removable storage 16 non-removable from the second slot of adaptor 12 (S110), In FIG. 4, the flow of transmission and reception of signals inside recording apparatus 6 (specifically, transmission and reception of signals about setting to the non-removable state between controller 18 and first removable storage 14 and between controller 18 and second removable storage 16) is simply indicated with arrowed dashed lines.

Here, “non-removable (state)” represents a concept that first removable storage 14 and second removable storage 16 are changed to a state where these cannot be physically removed and that a prohibition to remove first removable storage 14 and second removable storage 16 is presented to a user. The expression “first removable storage 14 and second removable storage 16 are changed to a state where these cannot be physically removed” means that, for example, a) the shutters disposed at the openings of the first slot and second slot of adaptor 12 are closed or b) first removable storage 14 and second removable storage 16 in the non-removable state cannot be removed even by pressing an inject button usually placed in adaptor 12 (button not mechanically interlocked with a removal mechanism), although first removable storage 14 and second removable storage 16 are usually removed by pressing the button. To be noted, the "non-removable state" also encompasses the case where first removable storage 14 and second removable storage 16 are removed by pressing the inject button for a long time. The expression "a prohibition to remove first removable storage 14 and second removable storage 16 is presented to a user" represents a state where an access lamp disposed in adaptor 12 is turned on, for example.

Generator 24 in control apparatus 8 generates the first access information concerning first recording region 28 in first removable storage 14 reserved by reserver 22, based on the first recording property information and the bandwidth information. The first access information contains a) information indicating the addresses of the blocks contained in first recording region 28 which is reserved, b) information indicating the size of the video data to be transmitted within a predetermined time, and c) information indicating the interval of transmission of the video data, for example. Here, generator 24 determines the size of the video data to be transmitted within a predetermined time and the interval of transmission of the video data such that video processing apparatus 4 can write the video data to first removable storage 14 through part of the communication bandwidth (e.g., 2 Gbps).

Generator 24 in control apparatus 8 generates the second access information concerning second recording region 30 in the second removable storage 16 reserved by reserver 22, based on the second recording property information and the bandwidth information. The second access information contains a) information indicating the addresses of the blocks contained in second recording region 30 which is reserved, b) information indicating the size of the video data to be transmitted within a predetermined time, and c) information indicating the interval of transmission of the video data, for example. Here, generator 24 determines the size of the video data to be transmitted within a predetermined time and the interval of transmission of the video data such that video processing apparatus 4 can write the video data to second removable storage 16 through the remaining part of the communication bandwidth (e.g., 2 Gbps).

Communicator 20 in control apparatus 8 transmits the first access information and second access information generated by generator 24 to video processing apparatus 4 via network 10 (S111). Video processing apparatus 4 receives the first access information and the second access information from control apparatus 8, and stores the received first access information and second access information in the memory such as a ROM or a RAM.

Based on the first access information from control apparatus 8, video processing apparatus 4 directly accesses to first removable storage 14 in recording apparatus 6 via network 10 by directly specifying the address inside the storage using the protocol of the storage included in recording apparatus 6 (S112). Specifically, video processing apparatus 4 generates a first recording command based on the first access information from control apparatus 8, and transmits the generated first recording command with the video data to recording apparatus 6. Here, more precisely, the video data transmitted to recording apparatus 6 by video processing apparatus 4 is pieces of partial data divided from the video data by video processing apparatus 4. The first recording command is a command signal for instructing controller 18 in recording apparatus 6 to write the video data to first recording region 28 in first removable storage 14. The first recording command contains a) information indicating the address of the video data to be transferred, b) information indicating the size of the video data to be transmitted, and c) information indicating the addresses of the blocks contained in first recording region 28, to which the video data is transferred, for example. Here, video processing apparatus 4 transmits the video data to recording apparatus 6 with the size of transmission and interval indicated by the first access information.

In the above-mentioned processing in step S112, as in the present embodiment, video processing apparatus 4 may transmit the first recording command to recording apparatus 6 as Processing Example 1, or the first recording command may be stored in video processing apparatus 4, and recording apparatus 6 may read out the first recording command from video processing apparatus 4 as Processing Example 2. Here, a specific example of Processing Example 2 described above will be described, Video processing apparatus 4 places video data to be written, in a memory space inside video processing apparatus 4 accessible to network 10. Next, video processing apparatus 4 generates the first recording command for the video data to be written, in a memory space inside video processing apparatus 4 accessible via network 10. Next, video processing apparatus 4 writes information to a register of recording apparatus 6, the information indicating that the first recording command is generated. Next, recording apparatus 6 reads out the first recording command inside video processing apparatus 4, and analyzes it, Next, recording apparatus 6 transfers the video data inside video processing apparatus 4 to recording apparatus 6, When the transfer is completed, recording apparatus 6 notifies video processing apparatus 4 of the completion of the transfer. Processing Example 2 described above can be also applied to step S114 described later in the same manner.

Although in step S112 described above, video processing apparatus 4 directly accesses to first removable storage 14 in recording apparatus 6 via network 10 in the present embodiment, any other configuration can be used. For example, video processing apparatus 4 may issue the recording command to controller 18 without specifying the address of the writing destination in recording apparatus 6, and controller 18 in recording apparatus 6 may determine the removable storage as the writing destination (first removable storage 14 or second removable storage 16) and the address of the writing destination based on the recording command from video processing apparatus 4. In other words, this application encompasses not only the case where video processing apparatus 4 controls so-called striping recording as in the present embodiment, but also a case where controller 18 in recording apparatus 6 controls striping recording. This is also applied to step S114 described later.

Controller 18 in recording apparatus 6 writes the video data (one or more of the pieces of partial data divided from the video data) to first recording region 28 of first removable storage 14 based on the first recording command from video processing apparatus 4 (S113), Specifically, controller 18 in recording apparatus 6 continuously writes the video data from the leading page of the leading block (block A illustrated in (a) of FIG. 5) contained in first recording region 28 of first removable storage 14.

Subsequently, based on the second access information from control apparatus 8, video processing apparatus 4 directly accesses to second removable storage 16 in recording apparatus 6 via network by directly specifying the address inside the storage using the protocol of the storage included in recording apparatus 6 (S114). Specifically, video processing apparatus 4 generates the second recording command based on the second access information from control apparatus 8, and transmits the generated second recording command with the video data to recording apparatus 6.

Here, more precisely, the video data transmitted to recording apparatus 6 by video processing apparatus 4 is pieces of partial data divided from the video data by video processing apparatus 4, The second recording command is a command signal for instructing controller 18 in recording apparatus 6 to write the video data to second recording region 30 of second removable storage 16. The second recording command contains a) information indicating the address of the video data to be transferred, b) information indicating the size of the video data to be transmitted, and c) information indicating the addresses of the blocks contained in second recording region 30, to which the video data is transferred, for example. Here, video processing apparatus 4 transmits the video data to recording apparatus 6 with the transmission size and interval indicated by the second access information.

Controller 18 in recording apparatus 6 writes the video data (one or more of the pieces of partial data divided from the video data) to second recording region 30 of second removable storage 16 based on the second recording command from video processing apparatus 4 (S115). Specifically, controller 18 in recording apparatus 6 continuously writes the video data from the leading page of the leading block (block D illustrated in (b) of FIG. 5) contained in second recording region 30 of second removable storage 16.

In other words, in the present embodiment, for each of the pieces of partial data divided from the video data, controller 18 in recording apparatus 6 writes the piece of partial data to one of first removable storage 14 or second removable storage 16 while switching the write destination of the piece of partial data between first removable storage 14 and second removable storage 16. This operation is the same operation as so-called striping recording.

When writing of the pieces of partial data divided from the video data to one of first removable storage 14 or second removable storage 16 is completed, video processing apparatus 4 notifies control apparatus 8 of the completion of access to recording apparatus 6 via network 10 (S116).

In response to the notification from video processing apparatus 4, communicator 20 in control apparatus 8 requests controller 18 in recording apparatus 6 to migrate the video data (one or more of the pieces of partial data) from second removable storage 16 to first removable storage 14 (S117).

In response to the request from control apparatus 8, controller 18 in recording apparatus 6 reads out the video data (one or more of the pieces of partial data) written in second removable storage 16 (S118), and writes the read video data (one or more of the pieces of partial data) to first removable storage 14 (S119). In other words, before first removable storage 14 is removed, controller 18 in recording apparatus 6 copies the video data (one or more of the pieces of partial data) written in second removable storage 16 to first removable storage 14. Thereby, all the pieces of partial data divided from the video data are stored in first removable storage 14. At this time, after the video data is copied, the video data copied to first removable storage 14 is deleted from second removable storage 16 by controller 18. Thereby, the video data is migrated from second removable storage 16 to first removable storage 14.

Communicator 20 in control apparatus 8 requests controller 18 in recording apparatus 6 of a permission to remove first removable storage 14 and second removable storage 16 (S120). In response to the request from control apparatus 8, controller 18 in recording apparatus 6 sets first removable storage 14 and second removable storage 16 to the removable state (S121), Thereby, first removable storage 14 becomes removable from the first slot of adaptor 12 (122), and second removable storage 16 becomes removable from the second slot of adaptor 12 (S123). In FIG. 4, the flow of transmission and reception of signals inside recording apparatus 6 (specifically, transmission and reception of signals about setting to the removable state between controller 18 and first removable storage 14 and between controller 18 and second removable storage 16) is simply indicated with arrowed dashed lines.

Here, "removable (state)" represents a concept that first removable storage 14 and second removable storage 16 are changed to a state where these can be physically removed, and a permission to remove first removable storage 14 and second removable storage 16 is presented to a user. The expression "first removable storage 14 and second removable storage 16 are changed to a state where these can be physically removed" means that, for example, a) shutters disposed at the openings of the first slot and the second slot are opened, or b) first removable storage 14 and second removable storage 16 can be removed by pressing the inject button. The expression "a permission to remove first removable storage 14 and second removable storage 16 is presented to a user" represents a state where the access lamp disposed in adaptor 12 is turned off, for example.

The video data stored in first removable storage 14 can be read out by another apparatus after the user removes first removable storage 14 from the first slot of adaptor 12.

[1-5. Effects]

In the present embodiment, data recording system 2 includes first removable storage 14 and second removable storage 16 which are removable, and controller 18 which controls writing of video data to first removable storage 14 and second removable storage 16. Controller 18: (a) for each of pieces of partial data divided from the video data, writes the piece of partial data to one of first removable storage 14 or second removable storage 16 while switching a write destination of the piece of partial data between first removable storage 14 and second removable storage 16; and (b) migrates one or more of the pieces of partial data written in second removable storage 16 to first removable storage 14 before first removable storage 14 is removed.

Thereby, the pieces of partial data are distributed and written to first removable storage 14 and second removable storage 16, thus avoiding concentrated access to a single removable storage from video processing apparatus 4. As a result, the writing performance (e.g., recording rate) in first removable storage 14 and second removable storage 16 can be enhanced. Moreover, because the one or more of the pieces of partial data written in second removable storage 16 are migrated to first removable storage 14 before first removable storage 14 is removed. Thus, first removable storage 14 can be removed from adaptor 12 in a state where all the pieces of partial data divided from the video data are stored in first removable storage 14.

In the present embodiment, controller 18 (c) sets first removable storage 14 to a non-removable state before writing each of the pieces of partial data to first removable storage 14, and (d) migrates the one or more of the pieces of partial data written in second removable storage 16 to first removable storage 14, and then, sets first removable storage 14 to a removable state.

Thereby, removal of first removable storage 14 from adaptor 12 by mistake of the user when the partial data is being written to first removable storage 14 can be avoided.

In the present embodiment, the method of controlling data recording system 2 is a method of controlling data recording system 2 including first removable storage 14 and second removable storage 16 which are removable, and controller 18 which controls writing of video data to first removable storage 14 and second removable storage 16. The method of controlling data recording system 2 includes: (a) for each of pieces of partial data divided from the video data, writing, by controller 18, the piece of partial data to one of first removable storage 14 or second removable storage 16 while switching a write destination of the piece of partial data between first removable storage 14 and second removable storage 16; and (b) migrating, by controller 18, one or more of the pieces of partial data written in second removable storage 16 to first removable storage 14 before first removable storage 14 is removed.

Thereby, the pieces of partial data are distributed and written to first removable storage 14 and second removable storage 16, thus avoiding concentrated access to a single removable storage from video processing apparatus 4. As a result, the writing performance in first removable storage 14 and that in second removable storage 16 can be enhanced. Moreover, because the one or more of the pieces of partial data written in second removable storage 16 are migrated to first removable storage 14 before first removable storage 14 is removed, first removable storage 14 can be removed from adaptor 12 in a state where all the pieces of partial data divided from the video data are stored in first removable storage 14,

[1-6. Modification]

Although in response to the request from control apparatus 8, controller 18 in recording apparatus 6 migrates the video data (one or more of the pieces of partial data) written in second removable storage 16 to first removable storage 14 in the present embodiment, another configuration as follows may be used, for example.

Specifically, controller 18 may migrate the one or more of the pieces of partial data written in second removable storage 16 to first removable storage 14 in response to receipt of a request to remove first removable storage 14 from the outside.

Thereby, controller 18 can ensure the migration of the one or more of the pieces of partial data written in second removable storage 16 to first removable storage 14 before first removable storage 14 is removed. The request to remove indicates a signal or the like output from the inject button when the user presses the inject button disposed in adaptor 12, for example, the signal indicating that the inject button is pressed.

Embodiment 2

[2-1. Functional Configuration of Recording Apparatus]

Figure 6:
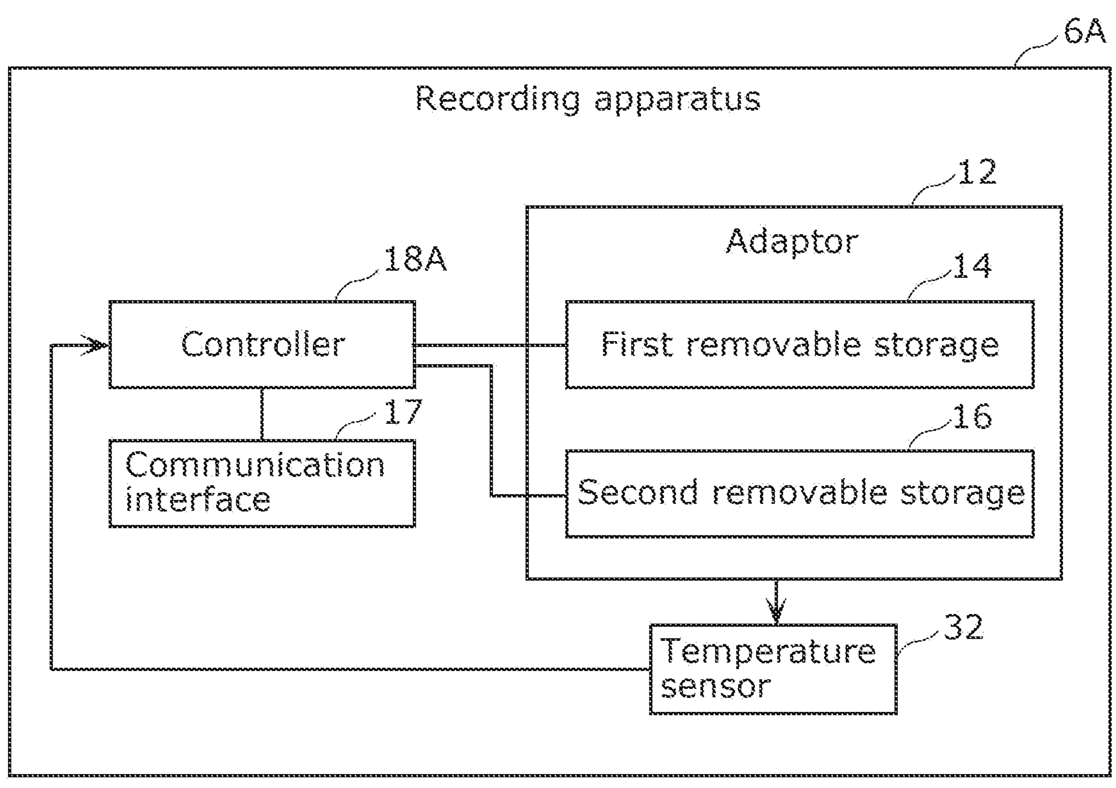
FIG. 6 is a block diagram illustrating a functional configuration of the recording apparatus according to Embodiment 2.

The functional configuration of recording apparatus 6A in the data recording system according to Embodiment 2 will be described with reference to FIG. 6. FIG. 6 is a block diagram illustrating the functional configuration of recording apparatus 6A according to Embodiment 2, In the present embodiment, identical reference signs will be given to identical components to those in Embodiment 1 above, and their descriptions will be omitted.

As illustrated in FIG. 6, recording apparatus 6A according to Embodiment 2 has a functional configuration including temperature sensor 32 in addition to adaptor 12, first removable storage 14, second removable storage 16, and controller 18A.

Temperature sensor 32 detects the temperature of first removable storage 14 inserted in the first slot of adaptor 12. Temperature sensor 32 outputs the detected temperature to controller 18A.

Based on the temperature detected by temperature sensor 32, for each of the pieces of partial data divided from the video data, controller 18A switches the write destination of the piece of partial data between first removable storage 14 and second removable storage 16.

[2-2. Operation of Recording Apparatus]

Figure 7:
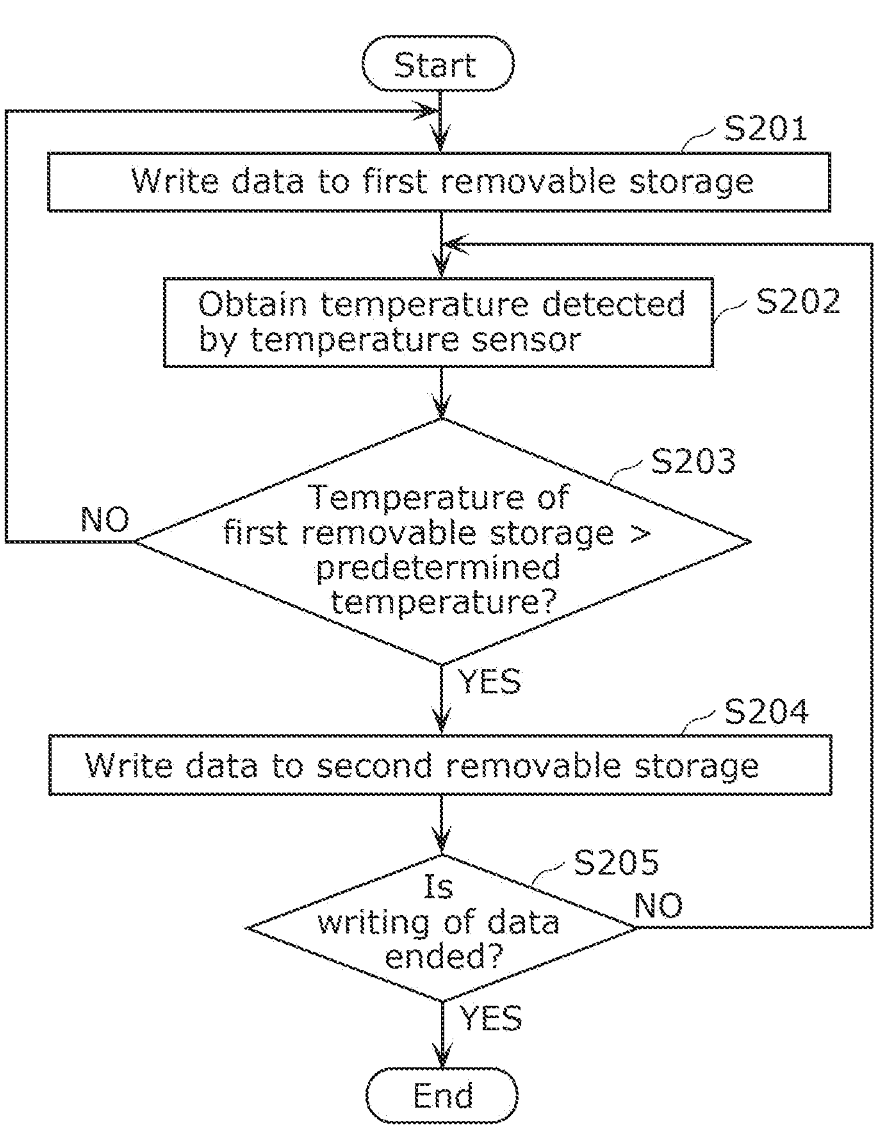
FIG. 7 is a flowchart illustrating a flow of the operation of the recording apparatus according to Embodiment 2.

The operation of recording apparatus 6A according to Embodiment 2 will be described with reference to FIG. 7. FIG. 7 is a flowchart illustrating a flow of the operation of recording apparatus 6A according to Embodiment 2.

In the description of Embodiment 1 above, for each of the pieces of partial data divided from the video data, controller 18 in recording apparatus 6 determines the removable storage (first removable storage 14 or second removable storage 16) for the write destination of the piece of partial data. In the present embodiment, as in the flowchart illustrated in FIG. 7, for each of the pieces of partial data divided from the video data, controller 18A in recording apparatus 6A switches the write destination of the piece of partial data between first removable storage 14 and second removable storage 16 based on the temperature detected by temperature sensor 32.

As illustrated in FIG. 7, controller 18A writes the video data (one or more of the pieces of partial data) to first removable storage 14 (S201). Controller 18A obtains the temperature detected by temperature sensor 32 (S202), and determines whether the temperature of first removable storage 14 is higher than a predetermined temperature (e.g., 75° C.) (one example of a first temperature and a second temperature) (S203).

When the temperature of first removable storage 14 is less than or equal to the predetermined temperature (NO in S203), the processing returns to step S201 described above.

In contrast, when the temperature of first removable storage 14 is higher than the predetermined temperature (YES in S203), controller 18A writes the video data (one or more of the pieces of partial data) to second removable storage 16 (S204).

After step S204, when the writing of the video data is continued (NO in S205), the processing returns to step S202 described above. In contrast, when the writing of the video data is completed (YES in S205), the processing is ended.

[2-3. Effects]

In the present embodiment, the data recording system further includes temperature sensor 32 which detects a temperature of first removable storage 14. For each of the pieces of partial data divided from the video data, controller 18A (e) switches a write destination of the piece of partial data to first removable storage 14 when the temperature detected by temperature sensor 32 is less than or equal to a first temperature, and (f) switches the write destination of the piece of partial data to second removable storage 16 when the temperature detected by temperature sensor 32 is higher than a second temperature which is more than or equal to the first temperature.

In this configuration, when the temperature of first removable storage 14 becomes high, the recording rate of first removable storage 14 is reduced. More specifically, because first removable storage 14 may be broken when its temperature becomes high, control to reduce the writing amount (heat generation amount) of the data written per unit time by reducing the operating clock frequency, for example, is performed to avoid an increase in temperature of first removable storage 14 beyond a predetermined temperature. This leads to delay of the timing for notification of completion of writing to video processing apparatus 4, and as a result, the recording rate of the data is reduced from the standpoint of video processing apparatus 4. For this reason, when the temperature of first removable storage 14 exceeds the second temperature, a further increase in temperature of first removable storage 14 can be suppressed by writing the video data to second removable storage 16. To be noted, the first temperature and the second temperature may be the same temperature (e.g., 75° C.), or may be different temperatures (e.g., the first temperature is 70° C., and the second temperature is 75° C.).

[2-4. Modification]

Although in the present embodiment, controller 18A writes the video data only to first removable storage 14 when the temperature of first removable storage 14 is less than or equal to the first temperature, a configuration below may be used, for example.

Specifically, when the temperature detected by temperature sensor 32 is less than or equal to the first temperature, controller 18A may record the piece of partial data to both first removable storage 14 and second removable storage 16.

In such a configuration, when the temperature detected by temperature sensor 32 is less than or equal to the first temperature, a possibility of loss of partial data caused by breakage of first removable storage 14 or the like can be reduced by performing so-called mirroring recording. To be noted, it may be configured to switch mirroring recording to striping recording when the temperature of first removable storage 14 becomes high (exceeds the first temperature). This is for avoiding writing of the data only to second removable storage 16 in a high temperature state when first removable storage 14 and second removable storage 16 are storages of the same type and the temperatures of these become high by performing mirroring recording.

[Other Modifications and the Like]

The above embodiments have been described as examples of the technique disclosed in this application. However, the technique disclosed in the present disclosure is not limited to this, and can also be applied to embodiments obtained from the above embodiments subjected to appropriate change, replacement, addition, omission, or the like. The components described in the above embodiments can be combined into new embodiments.

Hereinafter, other embodiments will be illustrated.

Although recording apparatus 6 (6A) includes controller 18 (18A) in the above embodiments, any other configuration can be used, and video processing apparatus 4 may include controller 18 (18A). Moreover, controller 18 (18A) in recording apparatus 6 (6A) may execute the processings of video processing apparatus 4 and control apparatus 8 illustrated in the flowchart in FIG. 4. Specifically, when controller 18 (18A) in recording apparatus 6 (6A) receives the data from the outside, controller 18 (18A) may reserve the recording regions, and then write the received data to first removable storage 14 and second removable storage 16.

Although recording apparatus 6 (6A) includes two removable storages (first removable storage 14 and second removable storage 16) in the above embodiments, any other configuration can be used, and recording apparatus 6 (6A) may include three or more removable storages.

Although controller 18 (18A) in recording apparatus 6 (6A) migrates the video data written in second removable storage 16 to first removable storage 14 before first removable storage 14 is removed in the above embodiments, a configuration as below may be used. Specifically, utilizing vacant time (time during video processing apparatus 4 does not access to recording apparatus 6 (6A)), controller 18 (18A) may migrate the video data written in second removable storage 16 to first removable storage 14.

Although reserver 22 in control apparatus 8 reserves the continuous blocks in first removable storage 14 (second removable storage 16) as first recording region 28 (second recording region 30) in the above embodiments, any other configuration can be used. For example, reserver 22 may reserve one or more logic regions (logically divided recording regions, for example, namespaces) in first removable storage 14 (second removable storage 16) as first recording region 28 (second recording region 30).

Although recording apparatus 6 (6A) includes first removable storage 14 and second removable storage 16, both of which are removable in the above embodiments, any other configuration can be used, and recording apparatus 6 (6A) may include a removable storage and a non-removable fixed storage (such as an SSD), In this case, before the removable storage is removed, controller 18 (18A) may migrate the video data (one or more of the pieces of partial data) written in the removable storage to the fixed storage, or conversely, may migrate the video data (one or more of the pieces of partial data) written in the fixed storage to the removable storage.

In the above embodiments, controller 18 (18A) in recording apparatus 6 (6A) may set first removable storage 14 to the non-removable state when not all the pieces of partial data divided from the video data are written to first removable storage 14. Moreover, controller 18 (18A) in recording apparatus 6 (6A) may set first removable storage 14 to the removable state after all the pieces of partial data divided from the video data are written to first removable storage 14.

In the above embodiments, each of the components may be configured of dedicated hardware, or may be implemented by executing a software program suitable for the component. The components may be implemented by a program executor, such as a CPU or a processor, which reads out and executes software programs recorded on a recording medium such as a hard disk or a semiconductor memory.

Moreover, part or all of the functions of data recording system 2 according to the above embodiments may be implemented by a processor such as a CPU which executes programs.

As above, the embodiments have been described above as examples of the technique disclosed in the present disclosure. For this purpose, the accompanies drawings and detailed descriptions have been provided.

Accordingly, the components described in the attached drawings and the detailed description may also include not only components essential for solving the problem but also components which are not essential for solving the problem but described for illustration of the technique. For this reason, these non-essential components should not be immediately recognized as essential components because those non-essential components are described in the attached drawings and the detailed description.

Moreover, the above embodiments are for illustrations of the technique in the present disclosure, and therefore can be subjected to a variety of changes, replacements, additions, omissions, and the like within Claims or its equivalents.

INDUSTRIAL APPLICABILITY

The present disclosure is applicable to data recording systems which distributes and writes data to removable storages, for example.

The invention claimed is:

1. A data recording system comprising:

a first recording medium which is removable;

a second recording medium; and a controller configured to control writing of data to the first recording medium and the second recording medium, wherein the controller is configured to:

obtain, from the first recording medium, first recording property information that indicates a first page size, a first block size, and a first performance in units of pages of the first recording medium;

obtain, from the second recording medium, second recording property information that indicates a second page size, a second block size, and a second performance in units of pages of the second recording medium;

receive pieces of partial data divided from predetermined data;

based on the first recording property information and the second recording property information, reserve continuous regions in each of the first recording medium and the second recording medium and determine, as a write destination of each of the pieces of partial data, one of the first recording medium or the second recording medium;

perform striping recording by distributing and writing each of the pieces of partial data to one of the first recording medium or the second recording medium while switching the write destination between the first recording medium and the second recording medium, and migrate one or more of the pieces of partial data written in the second recording medium to the first recording medium by utilizing a vacant time that is a time during which a video processing apparatus does not access the first recording medium and the second recording medium.

2. The data recording system according to claim 1, wherein the controller is configured to set the first recording medium to a non-removable state before writing each of the pieces of partial data to the first recording medium, and set the first recording medium to a removable state after migrating the one or more of the pieces of partial data written in the second recording medium to the first recording medium.

3. The data recording system according to claim 1, wherein the controller is configured to migrate the one or more of the pieces of partial data written in the second recording medium to the first recording medium in response to receiving an external request to remove the first recording medium.

4. A method of controlling a data recording system including a first recording medium which is removable, a second recording medium, and a controller which controls writing of data to the first recording medium and the second recording medium, the method comprising:

obtaining, from the first recording medium by the controller, first recording property information that indicates a first page size, a first block size, and a first performance in units of pages of the first recording medium;

obtaining, from the second recording medium by the controller, second recording property information that indicates a second page size, a second block size, and a second performance in units of pages of the second recording medium;

based on the first recording property information and the second recording property information, reserving, by the controller, continuous regions in each of the first recording medium and the second recording medium and determining, by the controller, as a write destination of each of pieces of partial data divided from predetermined data, one of the first recording medium or the second recording medium;

performing, by the controller, striping recording by distributing and writing each of the pieces of partial data to one of the first recording medium or the second recording medium while switching the write destination between the first recording medium and the second recording medium; and migrating, by the controller, one or more of the pieces of partial data written in the second recording medium to the first recording medium by utilizing a vacant time that is a time during which a video processing apparatus does not access the first recording medium and the second recording medium.

* * * * *